US009639632B2

(12) United States Patent
Kim et al.

(10) Patent No.: US 9,639,632 B2
(45) Date of Patent: May 2, 2017

(54) METHOD AND APPARATUS FOR PERFORMING AUTO-NAMING OF CONTENT, AND COMPUTER-READABLE RECORDING MEDIUM THEREOF

(71) Applicant: SAMSUNG ELECTRONICS CO., LTD., Suwon-si (KR)

(72) Inventors: Ki-ho Kim, Seoul (KR); Moon-joo Lee, Suwon-si (KR); Yu-ri Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 13/891,738

(22) Filed: May 10, 2013

(65) Prior Publication Data
US 2013/0304733 A1 Nov. 14, 2013

(30) Foreign Application Priority Data

May 10, 2012 (KR) ........................ 10-2012-0049781

(51) Int. Cl.
G06F 17/30 (2006.01)

(52) U.S. Cl.
CPC .... *G06F 17/30943* (2013.01); *G06F 17/3002* (2013.01); *G06F 17/3012* (2013.01); *G06F 17/3028* (2013.01); *G06F 17/30778* (2013.01); *G06F 17/30858* (2013.01); *G06F 17/30997* (2013.01)

(58) Field of Classification Search
CPC ............. G06F 17/3002; G06F 17/3028; G06F 17/30778; G06F 17/30858; G06F 17/30943; G06F 17/30997
See application file for complete search history.

(56) References Cited

U.S. PATENT DOCUMENTS

| | | | |
|---|---|---|---|
| 5,296,884 A | 3/1994 | Honda et al. | |
| 6,657,661 B1 | 12/2003 | Cazier | |
| 8,854,479 B2 | 10/2014 | Hatori | |
| 2003/0046401 A1* | 3/2003 | Abbott et al. | ................ 709/228 |
| 2003/0113109 A1 | 6/2003 | Pelletier | |
| 2004/0199667 A1* | 10/2004 | Dobbins | ....................... 709/240 |
| 2005/0155016 A1* | 7/2005 | Bender | ........................ 717/106 |

(Continued)

FOREIGN PATENT DOCUMENTS

| | | |
|---|---|---|
| CN | 1988590 A | 6/2007 |
| JP | 2002374481 A | 12/2002 |

(Continued)

OTHER PUBLICATIONS

International Search Report dated Sep. 30, 2013, issued by the International Searching Authority in counterpart International Application No. PCT/KR2013/004116.

(Continued)

*Primary Examiner* — Shiow-Jy Fan
(74) *Attorney, Agent, or Firm* — Sughrue Mion, PLLC

(57) ABSTRACT

A method of performing auto-naming of content includes: receiving an auto-naming command for the content; performing auto-naming of the content by using different parameters according to different content types to obtain at least one auto-naming result for the content; and displaying the auto-naming result.

29 Claims, 14 Drawing Sheets

(56) References Cited

U.S. PATENT DOCUMENTS

| | | | |
|---|---|---|---|
| 2006/0050302 A1* | 3/2006 | Sawaguchi | G06F 17/3028 358/1.15 |
| 2006/0248150 A1* | 11/2006 | Chaar et al. | 709/206 |
| 2006/0277474 A1* | 12/2006 | Robarts et al. | 715/745 |
| 2006/0290789 A1 | 12/2006 | Ketola | |
| 2007/0027911 A1 | 2/2007 | Hakala et al. | |
| 2009/0006091 A1 | 1/2009 | Lindroos et al. | |
| 2009/0013052 A1* | 1/2009 | Robarts et al. | 709/206 |
| 2009/0055426 A1* | 2/2009 | Kalasapur et al. | 707/102 |
| 2009/0235167 A1* | 9/2009 | Boyer et al. | 715/708 |
| 2009/0291669 A1 | 11/2009 | Choi et al. | |
| 2009/0319672 A1* | 12/2009 | Reisman | 709/227 |
| 2010/0215272 A1 | 8/2010 | Isaev et al. | |
| 2011/0173235 A1* | 7/2011 | Aman et al. | 707/792 |
| 2011/0271173 A1 | 11/2011 | A'it-Mokhtar et al. | |
| 2012/0124079 A1* | 5/2012 | Kinsella | G06F 17/30041 707/769 |
| 2013/0173701 A1* | 7/2013 | Goyal | H04L 61/302 709/204 |

FOREIGN PATENT DOCUMENTS

| | | |
|---|---|---|
| JP | 2003338970 A | 11/2003 |
| JP | 2005346440 A | 12/2005 |
| JP | 2007504546 A | 3/2007 |

OTHER PUBLICATIONS

Written Opinion dated Sep. 30, 2013, issued by the International Searching Authority in counterpart International Application No. PCT/KR2013/004116.

Communication from the European Patent Office issued Jan. 7, 2016 in a counterpart European Application No. 13787725.4.

Communication dated Nov. 4, 2016, issued by the State Intellectual Property Office in counterpart Chinese Application No. 201380033088.0.

Communication dated Feb. 14, 2017, issued by the Japanese Patent Office in counterpart Japanese Application No. 2015-511370.

* cited by examiner

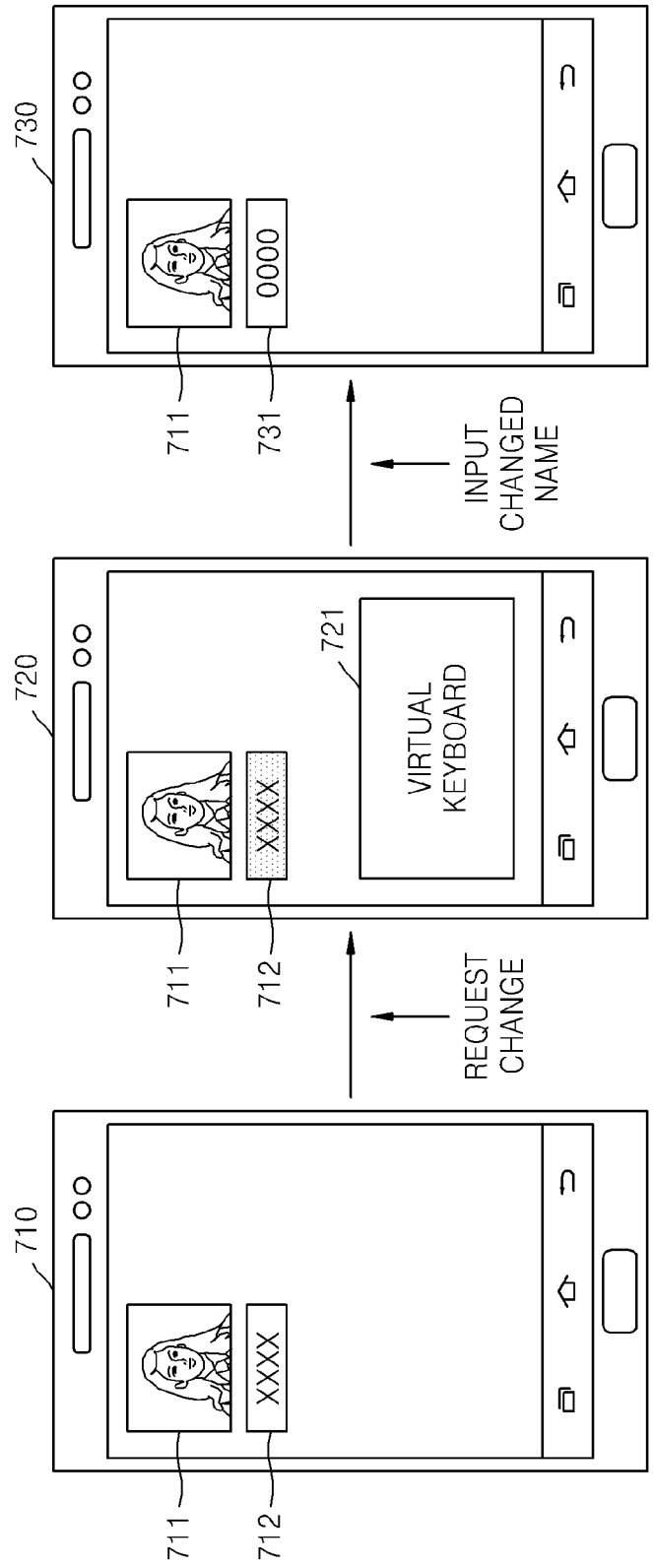

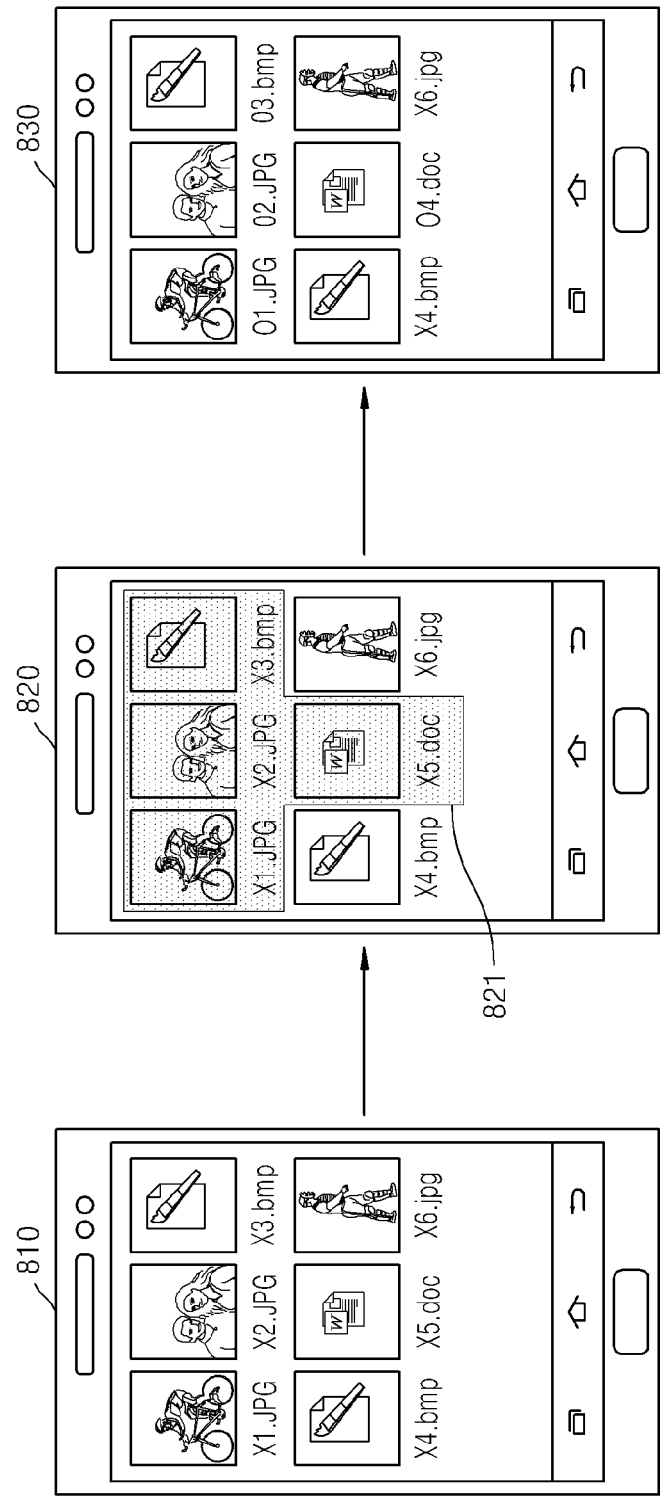

METHOD AND APPARATUS FOR PERFORMING AUTO-NAMING OF CONTENT, AND COMPUTER-READABLE RECORDING MEDIUM THEREOF

CROSS-REFERENCE TO RELATED PATENT APPLICATION

This application claims priority from Korean Patent Application No. 10-2012-0049781, filed on May 10, 2012, in the Korean Intellectual Property Office, the disclosure of which is incorporated herein in its entirety by reference.

BACKGROUND

1. Field

Apparatuses and methods consistent with exemplary embodiments relate to a method and an apparatus for performing auto-naming of content.

2. Description of the Related Art

Amounts and types of content which may be stored in or processed by an apparatus such as a smart phone, a handheld personal computer (PC), a tablet PC, or a smart television (TV) have increased. Accordingly, a user may have difficulty in storing and managing various types of contents. For example, when a name of an item of content does not correctly reflect details of the content, the user needs to verify each item of the content by reproducing or opening the content, which is inconvenient.

SUMMARY

One or more exemplary embodiments provide a method and an apparatus for performing auto-naming of content, which may easily generate a name by which a user may intuitively identify or search for the content, and a computer-readable recording medium thereof.

According to an aspect of an exemplary embodiment, there is provided a method of performing auto-naming of content, the method including: receiving an auto-naming command for the content; performing the auto-naming of the content by using different parameters according to different content types to obtain at least one auto-naming result for the content; and displaying the at least one auto-naming result.

The receiving the auto-naming command may be performed when a content process is requested, the content process including at least one of a content generation process, a content transmission process, and a content storage process.

The performing the auto-naming of the content may include performing different auto-naming by using predetermined context information of the content corresponding to the requested content process.

The method may further include automatically re-performing the auto-naming in response to an automatic change request of a user for the displayed auto-naming result.

The method may further include displaying an indicator in association with the displayed auto-naming result, wherein the indicator indicates an option to automatically change the displayed auto-naming result and automatically re-performing the auto-naming of the content according to user input information input through the indicator.

The automatically re-performing the auto-naming of the content may include automatically re-performing the auto-naming with a changed condition for obtaining a parameter.

The method may further include changing the auto-naming result into the user input information in response to a manual change request of a user for the displayed auto-naming result.

The performing of the auto-naming of the content may include: obtaining inference information regarding a context based on a content process by using a parameter determined according to a content type; and performing the auto-naming of the content based on the inference information, wherein the content process includes at least one of a content generation process, a content transmission process, and a content storage process.

The parameter may be determined based on a context-aware model according to the content type.

The obtaining the inference information may include: obtaining context information of the content based on the determined context-aware model and a content process requested on the content; and obtaining the inference information by fusing the context information.

The obtaining of the inference information may include obtaining the inference information based on communication with an external device.

When the auto-naming command for the content includes auto-naming commands for a plurality of different types of contents, the performing the auto-naming of the content may include respectively performing the auto-naming of the content by using a predetermined parameter according to a type of the content.

The displayed auto-naming result may include a plurality of candidate naming results, wherein the method further includes: receiving a selection signal for selecting one of the plurality of candidate naming information; and displaying the candidate auto-naming information selected according to the selection signal.

According to an aspect of another exemplary embodiment, there is provided an apparatus for performing auto-naming of content, the apparatus including: a storage unit which stores at least one program and data for performing auto-naming of the content; a touch-screen which receives user input information based on a touch and displays an auto-naming result of the content; and a processor which, based on an auto-naming command, performs the auto-naming of the content by using different parameters according to different types of the content by using the at least one program and the data stored in the storage unit to obtain at least one auto-naming result for the content, and displays the auto-naming result on the touch-screen.

According to an aspect of another exemplary embodiment, there is provided an apparatus for performing auto-naming of content, the apparatus including: a touch-screen which receives user input information based on a touch and displays at least one auto-naming result of the content; at least one processor that provides a user interface by controlling the touch-screen to perform the auto-naming of the content; and a storage unit that stores at least one program comprising a command configured to be executed by the processor, wherein the command is executed to receive an auto-naming command for the content, perform the auto-naming of the content by using different parameters according to different content types to obtain at least one auto-naming result for the content, and display the at least one auto-naming result.

According to an aspect of another exemplary embodiment, there is provided a non-transitory computer-readable recording medium having embodied thereon at least one program including a command for performing a method of performing auto-naming of content, wherein the method includes: receiving an auto-naming command for the content; performing the auto-naming of the content by using different parameters according to different content types to obtain at least one auto-naming result for the content; and displaying the at least one auto-naming result.

According to an aspect of another exemplary embodiment, there is provided is a method of performing auto-naming of content, the method including: determining a parameter for the auto-naming of the content according to a content type; obtaining inference information regarding the content based on a content process requested on the content and the parameter determined according to the content type; and generating auto-naming information of the content based on the inference information.

According to an aspect of another exemplary embodiment, there is provided is an apparatus for performing auto-naming of content, the apparatus including: a user input unit which receives a command for performing the auto-naming of the content; at least one processor which determines a parameter for the auto-naming of the content according to a content type, obtains inference information regarding the content based on the determined parameter and a content process requested on the content, and generates auto-naming information of the content based on the inference information; and a storage unit which stores information regarding the content which corresponds to the parameter.

BRIEF DESCRIPTION OF THE DRAWINGS

The above and other features and advantages of the present disclosure will become more apparent by describing in detail exemplary embodiments thereof with reference to the attached drawings in which:

FIGS. 7A, 7B, and 8 are views illustrating cases where an auto-naming result displayed on a touch-screen of the apparatus of FIG. 1 is changed according to exemplary embodiments;

DETAILED DESCRIPTION OF EXEMPLARY EMBODIMENTS

Figure 1:
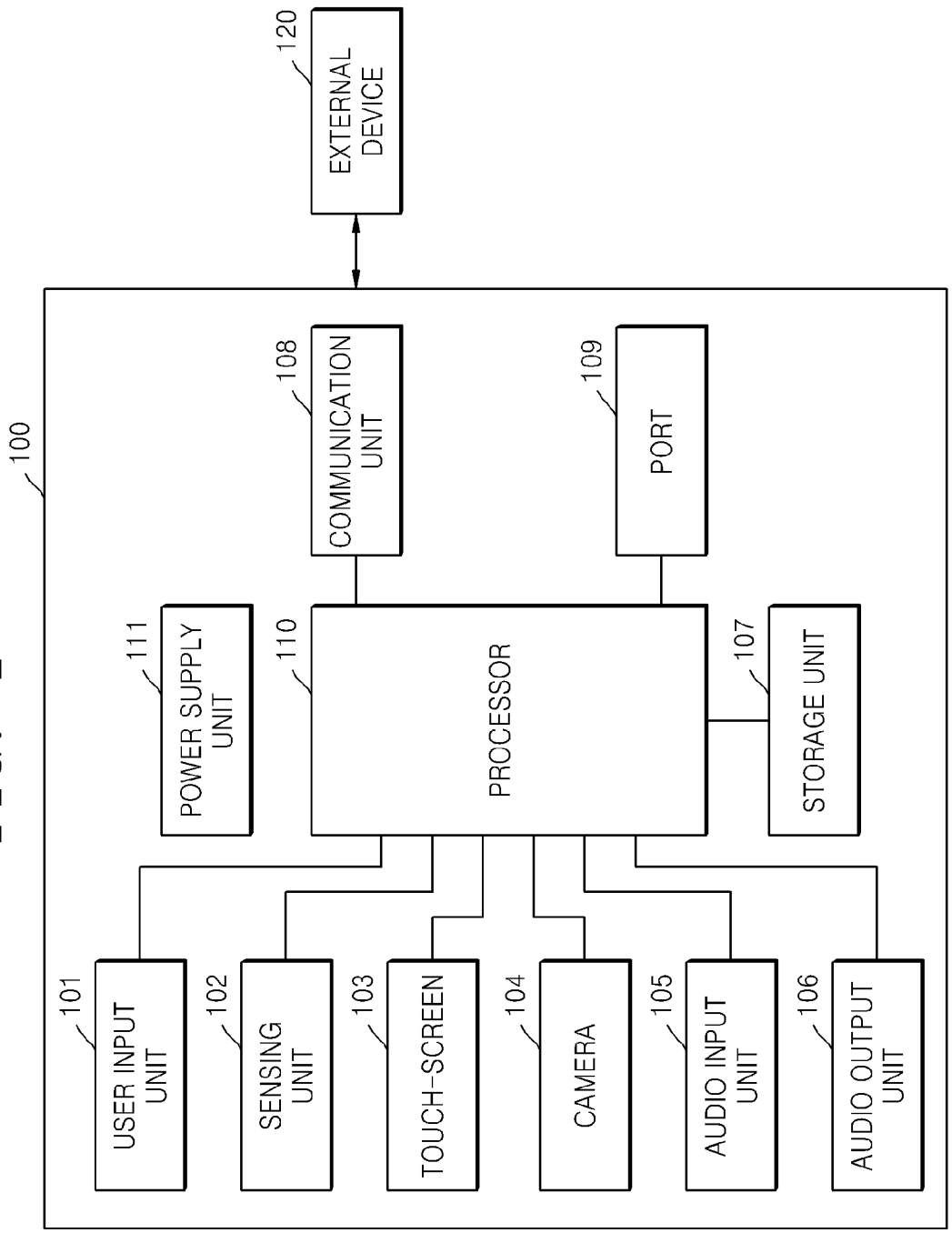
FIG. 1 is a block diagram illustrating an apparatus for performing auto-naming of content and an external device according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

While exemplary embodiments of the invention are susceptible to various modifications and alternative forms, specific embodiments thereof are shown by way of example in the drawings and will herein be described in detail. It should be understood, however, that there is no intent to limit exemplary embodiments of the invention to the particular forms disclosed, but conversely, exemplary embodiments of the invention are to cover all modifications, equivalents, and alternatives falling within the spirit and scope of the invention. In the following description of the present disclosure, a detailed description of known functions and configurations incorporated herein will be omitted when it may make the subject matter of the present disclosure unclear.

It will be understood that, although the terms first, second, etc. may be used herein to describe various elements, these elements should not be limited by these terms. These terms are only used to distinguish one element from another.

Most of the terms used herein are general terms that have been widely used in the technical art to which the present disclosure pertains. However, some of the terms used herein may be produced reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

The terms "a" and "an" do not denote a limitation of quantity, but rather denote the presence of at least one of the referenced item. For example, content used herein may be denoted as contents. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

The term "content" used herein refers to any information such as an image, a voice, a sound, and a text in a digital format. A content type may be divided into, but is not limited to, a video, a photograph, an electronic document, an electronic book, and an audio. However, in a digital content, since various types of contents may be combined into one content, a content type may not be limited to a specific type. That is, a content based on a social network service such as Twitter, or a blog, etc., and content based on an application such as a mobile messenger, an internet phone, etc. may be produced in an environment where various types of content may be combined with one another. Accordingly, in the above circumstances, a content type may be defined as a social network service-based content type or an application-based content type.

Examples of content based on an application may further include content based on various applications such as a mini diary application, a schedule management application, an e-mail application, an image management application, and a browsing application which may generate, store, and/or transmit content.

Content may be managed in a file format. Accordingly, a content type may be determined based on an extension in which the content is generated, stored, or transmitted. For example, when an extension of content is '.jpg', a content type may be determined to be a photograph. When an extension of content is '.htm', a content type may be determined to be an e-mail. When an extension of content is '.ac3', a content type may be determined to be an audio clip. When an extension of content is '.hwp', a content type may be determined to be a Hangul electronic document. When an extension of content is '.txt', a content type may be determined to be a memo. When an extension of content is '.mpeg', a content type may be determined to be a moving picture experts group (MPEG) video clip. However, a method of determining a content type is not limited thereto.

The term "auto-naming" which is performed on content, as used herein, refers to a process of automatically assigning to the content a name by which a user may intuitively identify and search for the content. Also, auto-naming of content may be performed by using different parameters according to a content type and a requested content process. Examples of a content process may include a content generation process, a content transmission process, and a content storage process, but the present disclosure is not limited thereto.

Auto-naming of content may also be used when an existing name of the content is to be changed. For example, when content that is already generated is to be transmitted to another device, auto-naming may be performed to change an existing name of the content. In this case, auto-naming may be performed according to a content transmission request using a reference point (or a parameter) different from that used to generate the content. For example, when content is to be generated and stored, auto-naming may be performed on the content according to a user of an apparatus for generating and storing the content. On the other hand, when content is to be transmitted, auto-naming may be performed on the content according to a user who receives the content. Since the above auto-naming processes are performed according to different reference points, it may be construed that the above auto-naming processes are performed in different manners.

Also, although a name is set by auto-naming performed on the content, such as in a case of an application program, auto-naming may also be used to change the set name. When a name of an application program is to be changed, auto-naming may be performed on the application program by using attribute information of the application program.

An auto-naming result may be generated in a natural language which the user may intuitively recognize. Accordingly, the auto-naming result may be represented as auto-naming information. Also, auto-naming performed on content may be referred to as auto-tagging performed on the content or auto-titling performed on the content.

An auto-naming command may be received directly from the user. Alternatively, the auto-naming command may be received according to a content generation request, a content storage request, or the content transmission request from the user.

User input information may be determined by a user's gesture. The user's gesture may have a form defined according to an input device. That is, when the input device is based on a touch-screen, examples of the user's gesture may include, but are not limited to, a tap, a touch and hold, a double tap, a drag, a panning, a flick, a drag and drop, and a sweep. Also, the user input information may include information that is input based on a virtual keyboard displayed on the touchscreen.

The user's gesture on the touch-screen may be performed by using a user's finger or a touch tool (e.g., a stylus pen). When the input device is a device based on a camera, examples of the user's gesture may include a space gesture based on an image captured by using the camera.

When examples of the input device include physical buttons, a dial, a slider switch, a joystick, and a click wheel, the user input information may be determined by a user's physical control of the input device.

The present disclosure will now be described more fully with reference to the accompanying drawings, in which exemplary embodiments are shown. In the drawings, like elements are denoted by like reference numerals and a repeated explanation thereof will not be given.

FIG. 1 is a block diagram illustrating an apparatus 100 for performing auto-naming of content and an external device 120 according to an exemplary embodiment.

Referring to FIG. 1, the apparatus 100 includes an electronic device which may generate, store, and transmit content and may be connected to the external device 120. Examples of the electronic device 120 may include a portable device, a smart phone, a smart television (TV), a personal computer (PC), a desktop PC, a notebook, a smart board, a tablet PC, a mobile device, a hand-held device or computer, a media player, a personal digital assistant (PDA), and a digital consumer electronics (CE) device. Examples of the digital CE device may include a digital TV (DTV) and an Internet protocol TV (IPTV).

The apparatus 100 includes, but is not limited to, a user input unit 101, a sensing unit 102, a touch-screen 103, a camera 104, an audio input unit 105, an audio output unit 106, a storage unit 107, a communication unit 108, a port 109, a processor 110, and a power supply unit 111.

The user input unit 101 generates input data (or control data) for controlling an operation of the apparatus 100 and user input information. Examples of the user input unit 101 may include a keypad, a dome switch, a touchpad which may substitute for a mouse, a jog wheel, a jog switch, and hardware (H/W) buttons.

The sensing unit 102 detects a current state of the apparatus 100 such as a position of the apparatus 100, a direction of the apparatus 100, or an acceleration or a deceleration of the apparatus 100, and generates a sensing signal for controlling an operation of the apparatus 100. The sensing unit 102 may include, for example, a proximity sensor.

The proximity sensor refers to a sensor that uses an electromagnetic force or infrared rays to detect the presence of a subject that is near or approaching a predetermined detection surface thereof without any physical contact with the subject. Examples of the proximity sensor include a transmissive photoelectric sensor, a direct-reflective photoelectric sensor, a mirror-reflective photoelectric sensor, a high-frequency oscillation proximity sensor, a capacitive proximity sensor, a magnetic proximity sensor, and an infrared proximity sensor.

User input information based on the touch-screen 103 may be generated according to a user's request or the user's gesture. The user's gesture may be defined in various ways by, for example, a combination of multiple touches, a touch pattern, a touch area, and a touch strength. A touch on a touch zone of the touch-screen 103 by the user's finger may be construed as a touch by a user's body part.

Also, the touch-screen 103 may include various sensors for detecting a touch, and the various sensors may include a proximity touch of the touch-screen 103 or an image sensor. A sensor included in the touch-screen 103 detects the user's gesture or touch pattern. Accordingly, the touch-screen 103 may generate a signal obtained by sensing a drag, a flick, a tap, a touch and hold, a double tap, a panning, or a sweep recognized as the user's gesture or touch pattern through the proximity sensor of the touch-screen 103.

An example of a sensor that detects a touch on the touch-screen 103 is a tactile sensor. The tactile sensor may detect various information such as, for example, a roughness of a contact surface thereof, a stiffness of a touched subject, and a temperature of a contact point. A touch on the touch-screen 103 may be generated when a pointer touches the touch-screen 103. Examples of the touch may include a multi-touch. A proximity touch on the touch-screen 103 may be generated when the pointer approaches the touch-screen 103 but does not touch the touch-screen 103. The pointer is a tool for touching or approaching a specific portion of the touch-screen 103. Examples of the pointer may include a stylus pen, a finger, a human body part other than the finger, and a tool operating as the finger. Accordingly, the pointer may be referred to as an external input device.

The touch-screen 103 outputs information processed by the apparatus 100. For example, the touch-screen 103 displays the user's gesture or touch pattern detected by the sensing unit 102 included in the touch-screen 103, control data or user input information input through the user input unit 101, or a screen image responding to a signal detected by the sensing unit 102.

The touch-screen 103 may also be an input and output device. When the touch-screen 103 is the input and output device, examples of the screen image displayed on the touch-screen 103 include a user interface (UI) screen image and a graphic user interface (GUI) screen image. The touch-screen 103 may display an image of content which is being reproduced and may receive user input information. Also, the touch-screen 103 may display a generated content and an auto-naming result of the content.

Examples of the touch-screen 103 may include, but are not limited to, a liquid crystal display (LCD), a thin film transistor (TFT) LCD, an organic light-emitting diode (OLED), a flexible display, a three-dimensional (3D) display, and an active-matrix OLED (AMOLED). The touch-screen 103 may also be referred to as a display. Two or more touch-screens 103 may be provided according to a type of the apparatus 100.

The camera 104 processes an image frame such as a still image or a video obtained by an image sensor thereof in a video call mode or a photographing mode. The image frame may be displayed on the touch-screen 103. The image frame processed by the camera 104 may be stored in the storage unit 107 or may be transmitted to the outside through the communication unit 108 or the port 109. Two or more cameras 104 may be provided according to a structure of the apparatus 100. Also, the camera 104 may be used as an input device that recognizes the user's space gesture. The image frame obtained by the camera 104 may be content generated according to a content generation request. In this case, the content may be construed as being requested to be generated when a shutter button is entered in the photographing mode of the camera 104.

The audio input unit 105 receives an external sound signal in a call mode, a recording mode, or a voice recognition mode, converts the external sound signal into electrical voice data, and transmits the electrical voice data to the processor 110. The audio input unit 105 may include, for example, a microphone. The audio input unit 105 may include any of various algorithms for removing noise generated in a process of receiving the external sound signal. The external sound signal input by the audio input unit 105 may be content which is generated or user input information based on the natural language that is input for performing auto-naming of the content. When the external sound signal is the user input information based on the natural language, the user input information may be user input information based on voice recognition. The external sound signal input by the audio input unit 105 may be stored in the storage unit 107 or may be transmitted to the outside through the communication unit 108 or the port 109.

The user input unit 101, the sensing unit 102, the touch-screen 103, the camera 104, and the audio input unit 105 may be referred to as input devices or input/output devices depending on whether an interface function between the apparatus 100 and the user is provided. For example, when examples of a user interface function between the apparatus 100 and the user include a touch recognition function, a voice recognition function, and a space gesture recognition function, the user input unit 101, the sensing unit 102, the camera 104, and the audio input unit 105 may be referred to as input devices, and the touch-screen 103 may be referred to as an input/output device.

The audio output unit 106 outputs a sound signal or an audio signal received from the outside in the call mode or an audio reproduction mode. The audio signal output unit 106 may include a speaker. When content is reproduced and an audio signal is included in the reproduced content, the audio output unit 106 outputs the audio signal included in the reproduced content. The audio input unit 105 and the audio output unit 106 may be integrally formed with each other, such as a headset.

The storage unit 107 stores at least one program and/or instruction set and a resource which may be implemented by the processor 110, which will be explained below. Examples of the at least one program include at least one program for performing auto-naming of content, an operating system program of the apparatus 100, an application set in the apparatus 100, and a program for performing various functions of the apparatus 100.

Examples of the resource include information of a national language used for auto-naming performed on content, parameter information for performing auto-naming according to each content type, information of an individual database such as a phonebook, user information of the apparatus 100, information needed to operate an application set in the apparatus 100, and a program needed to perform the above various functions. When a content type is a photograph, the parameter information for performing auto-naming may include information about, for example, a time, a position, and a subject in the photograph. When a content type is a Word electronic document or an e-mail, the parameter information for performing auto-naming may include, for example, a representative keyword and producer information.

The storage unit 107 may separately include a storage unit that stores at least one program needed to perform various functions of the apparatus 100 including the operating system program, and a storage unit that stores the applications and at least one program and a resource for implementing a method of performing auto-naming of content.

Examples of the storage unit 107 may include a non-volatile memory such as a high-speed random access memory, a magnetic disc storage device, or a flash memory, and other non-volatile semiconductor memories.

At least one program and/or an instruction set stored in the storage unit 107 may be classified into a plurality of modules according to a function.

Figure 2:
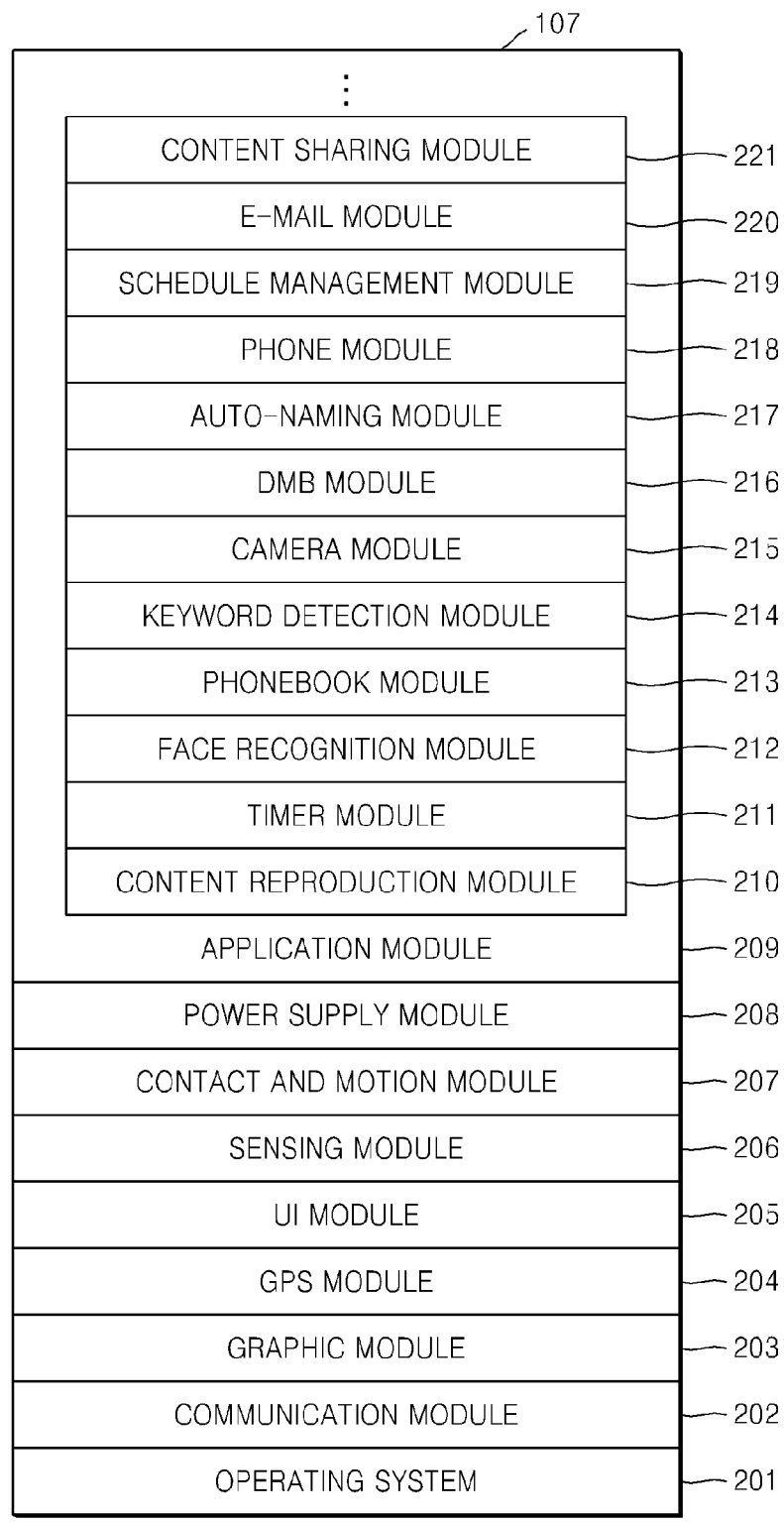
FIG. 2 is a table showing programs and/or instruction sets stored in a storage unit of FIG. 1.

FIG. 2 is a table in which programs and/or instruction sets stored in the storage unit 107 are classified according to modules. Referring to FIG. 2, the storage unit 107 includes, but is not limited to, an operating system 201, a communication module 202, a graphic module 203, a global position system (GPS) module, a UI module 205, a sensing module 206, a contact and motion module 207, a power supply module 208, and an application module 209.

Referring to FIG. 2, the application module 209 includes, but is not limited to, a content reproduction module 210, a timer module 211, a face recognition module 212, a phone-book module 213, a keyword detection module 214, a camera module 215, a digital multimedia broadcast (DMB) module 216, an auto-naming module 217, a phone module 218, a schedule management module 219, an e-mail module 220, and a content sharing module 221.

The operating system 201 which controls and manages a general function of the apparatus 100 includes a software component that allows communication between components of the apparatus 100.

The communication module 202 includes a software component that allows communication with the external device 120 through the communication unit 108 or the port 109 and processes data received from the external device 120 through the communication unit 108 or the port 109. The communication module 202 may transmit content on which auto-naming has been performed to the external device 120 through the communication unit 108 or the port 109. Also, the communication module 202 may request the external device 120 to perform auto-naming of content through the communication unit 108 or the port 109, receive an auto-naming result from the external device 120, and display the auto-naming result on the touch-screen 103.

The graphic module 203 includes a software component that performs rendering and adjusts a brightness of graphics displayed on the touch-screen 103 and a software component that provides a virtual keyboard (or a soft keyboard) for inputting a text to the application module 209.

The GPS module 204 includes a software component that determines a position of the apparatus 100 to obtain position information and provides the position information to an application that provides a position-based service. For example, when the auto-naming module 217 operates and position information is needed during performing auto-naming on content, the auto-naming module 217 may use the position information provided by the GPS module 204.

The UI module 205 includes a software component that provides a UI to an application that provides UI information based on the touch-screen 103.

The sensing module 206 includes a software component that determines sensing information based on the sensing unit 102 and provides the sensing information to the application module 209 so that the application module 209 provides a service based on the sensing information.

The contact and motion module 207 includes a software component that detects a touch contact based on the touch-screen 103, traces a motion based on the touch, and provides information about the traced motion to the application module 209.

The power supply module 208 includes a software component that controls power supply to a hardware component in the apparatus 100 by using the operating system 201 and controls a power-saving mode of power supplied to the touch-screen 103.

Functions of modules included in the application module 209 may be easily apprehended by a person of ordinary skill in the art, and thus the following explanation will be given on application modules related to exemplary embodiments.

When the apparatus 100 receives an auto-naming command based on the content generation request, the content storage request, or the content transmission request, the auto-naming module 217 begins to operate under control of the processor 110. Accordingly, in order to perform auto-naming by using different parameters according to different content types, the auto-naming module 217 determines a content type and determines parameters related to reference points for performing auto-naming by using different parameters according to the determined content type. The auto-naming module 217 requests a corresponding application module from application modules to operate according to the determined parameters.

For example, when content is a photograph and determined parameters are a time, a position, and a subject in the photograph, the auto-naming module 217 obtains time information about a time when the content is generated, stored, or transmitted, position information, and information about a subject included in the content by using the timer module 211, the GPS module 205, and the face recognition module 212. When the information about the subject is obtained by the face recognition module 212, a person corresponding to a detected face recognition result may be searched for in the phonebook module 213. When the person is found in the phonebook module 213, the auto-naming module 217 obtains inference information by using relationship information based on the person. The auto-naming module 217 performs auto-naming of the content based on the inference information and displays an auto-naming result on the touch-screen 103 by using the graphic module 203.

Modules included in the application module 209 are not limited to modules illustrated in FIG. 2 and the application module 209 may further include various other modules such as an instant messaging module, a video conference module, an image management module, a browsing module, a calendar module, a widget module, a search module, and a Word document production module. Also, modules included in the application module 209 may be referred to as engines.

The communication unit 108 may communicate with the external device 120 through a wired network such as wired Internet or a wireless network such as wireless Internet, wireless Intranet, wireless phone network, wireless local area network (LAN), Wi-Fi, Wi-Fi direct (WFD), third generation (3G), 4G, Bluetooth, infrared data association (IrDA), radio frequency identification (RFID), ultra wide-band (UWB), Zigbee, or near-field communication (NFC).

The communication unit 108 may include at least one of, but is not limited to, a broadcast receiving module, a mobile communication module, a wireless Internet module, a wired Internet module, a short distance communication module, and a position information module.

The broadcast receiving module receives a broadcast signal and/or broadcast-related information from an external broadcast management server (not shown) through a broadcast channel. Examples of the broadcast channel may include a satellite channel and a terrestrial channel. The mobile communication module transmits/receives a wireless signal to/from a base station (not shown) and the external device 120 through a mobile communication network. Examples of the wireless signal may include various types of data according to transmission/reception of a voice call signal, a video call signal, or a text/multimedia message. The wireless Internet module refers to a module for accessing the Internet in a wireless manner. The wired Internet module refers to a module for accessing the Internet in a wired manner.

The short distance communication module refers to a module for short distance-based communication. Examples of a short distance communication technology may include Bluetooth, RFID, infrared communication, UWB, Zigbee, WFD, and NFC. The position information module is a module for confirming or obtaining a position of the apparatus 100. For example, the position information module may be a GPS-based position information module. The GPS-based position information module receives position information from a plurality of artificial satellites. The position information may include coordinate information representing a latitude and a longitude.

The port 109 may transmit/receive data to/from the external device 120 by using a plug and play interface such as a universal serial bus (USB) port (not shown). The plug and play interface refers to a module that allows the external device 120 to be inserted into a plug of the apparatus 100 and played.

The power supply unit 111 supplies power to various elements of the apparatus 100. The power supply unit 111 includes at least one power supply such as a battery and an alternating current (AC) power supply. In an alternative exemplary embodiment, the apparatus 100 may not include the power supply 111, and may include a connection unit (not shown) that may be connected to an external power supply unit (not shown).

The processor 110 which controls an overall operation of the apparatus 100 may be referred to as at least one processor. The reason why the processor 110 may be referred to as at least one processor is that, although the processor 110 is illustrated as a single chip in FIG. 1, the processor 110 may operate as a plurality of processors according to a function of the apparatus 100.

The processor 110 may control the user input unit 101, the sensing unit 102, the touch-screen 103, the camera 104, the audio input unit 105, the audio output unit 106, the storage unit 107, the communication unit 108, and the port 109 by using various modules and the operating system 201 stored in the storage unit 107. Accordingly, the processor 110 may be referred to as a controller, a microprocessor, or a digital signal processor. Also, the processor 110 may provide a user interface based on the user input unit 101, the sensing unit 102, the touch-screen 103, the camera 104, and the audio input unit 105 by using the UI module 205 and the operating system 201.

The processor 110 may execute at least one program related to a method of performing auto-naming of content. The processor 110 may execute a program by reading the program from the storage unit 107, or may execute a program by downloading the program from the external device 120 connected to the processor 110 through the communication unit 108. In this case, the external device 120 may be referred to as an application providing server (not shown) or an application market server. However, the processor 110 may execute at least one program related to a method of performing auto-naming and stored in the external device 120, receive an auto-naming result, and display the auto-naming result on the touch-screen 103. The processor 110 may include an interface function unit between the processor 110 and various functional modules in the apparatus 100. An operation of the processor 110 related to a method of performing auto-naming of content will be explained in detail below with reference to FIGS. 3 through 13.

Figure 10:
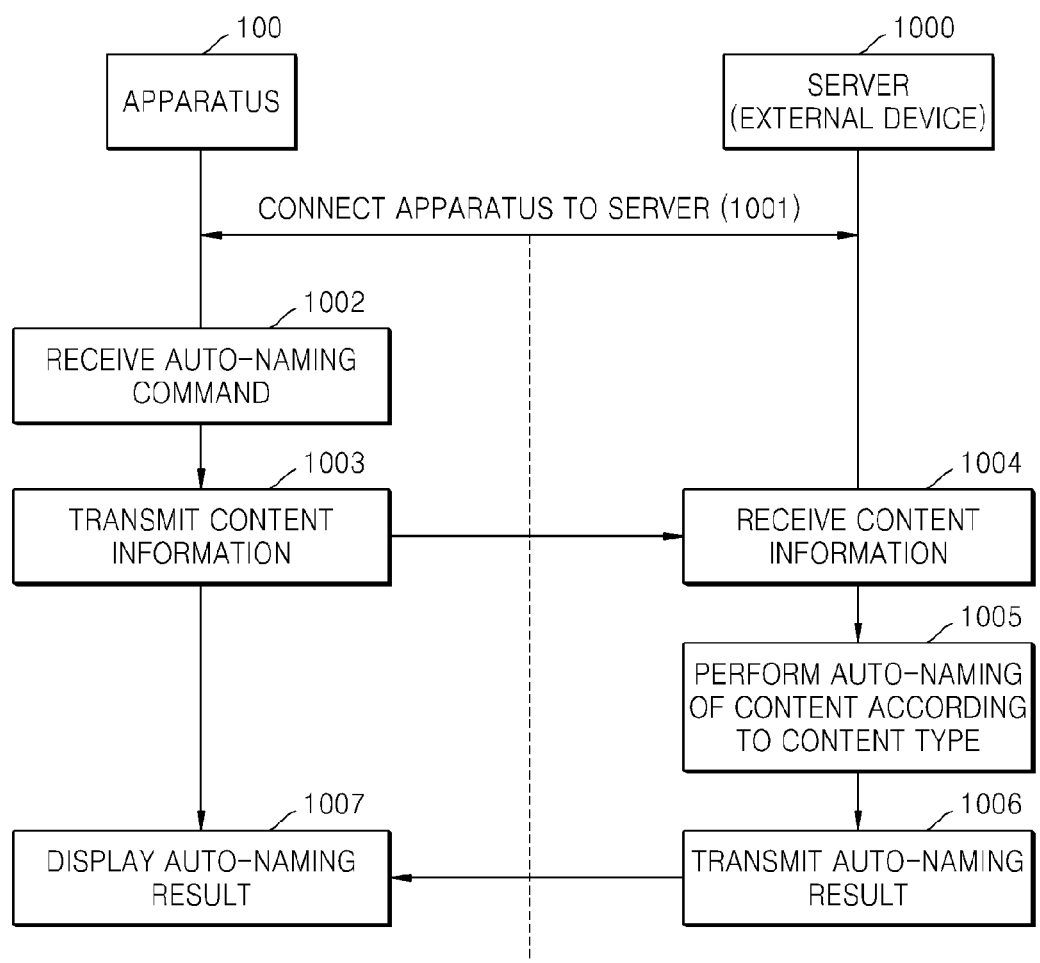
FIG. 10 is a flowchart illustrating an operation between a server and an apparatus for performing auto-naming of content according to an exemplary embodiment.

The external device 120 may include the application providing server or the application market server as described above, and may include a cloud server for performing auto-naming of content, such as a server 1000 of FIG. 10. The apparatus 100 and the external device 120 may be connected to each other through a network based on one of communication methods available for the communication unit 108.

Figure 3:
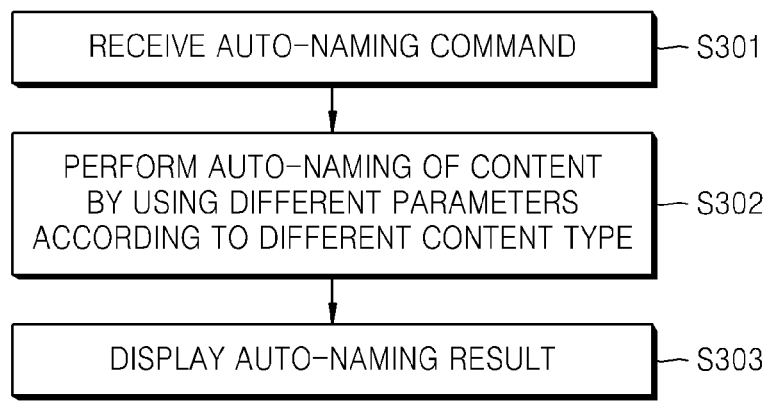
FIG. 3 is a flowchart illustrating a method of performing auto-naming of content according to an exemplary embodiment.

FIG. 3 is a flowchart illustrating a method of performing auto-naming of content according to an exemplary embodiment. The method of FIG. 3 is performed by the processor 110.

In step S301, the processor 110 receives the auto-naming command according to the user's input information. The processor 107 starts an auto-naming function by loading the auto-naming module 217 stored in the storage unit 107.

Accordingly, in step S302, the processor 110 performs auto-naming of content by using a parameter according to a content type of content on which the auto-naming is to be performed. The auto-naming performed in step S302 may be performed by using different parameters according to different content types. For example, when the content type is a first type, the processor 110 performs auto-naming of content by using a first predetermined parameter. When the content type is a second type, the processor 110 performs auto-naming of content by using a second predetermined parameter. The auto-naming of the content by using the different parameter includes auto-naming according to an auto-naming reference point determined according to a content type. The different parameters may be referred to as a different manners. The auto-naming reference point may be referred to as a auto-naming parameter.

It is determined whether the auto-naming command is received by the content generation request, the content storage request, or the content transmission request. When the auto-naming command is received by the content generation request, the content on which the auto-naming is to be performed may be, for example, a photograph file obtained by the camera 104. When the auto-naming command is received by the content storage request, the content may be, for example, a video file received through the communication unit 108 by the content sharing module 221. When the auto-naming command is received in response to the content transmission request, the content may be, for example, an e-mail file transmitted to the outside through the communication unit 108 by the e-mail module 220.

Figure 4:
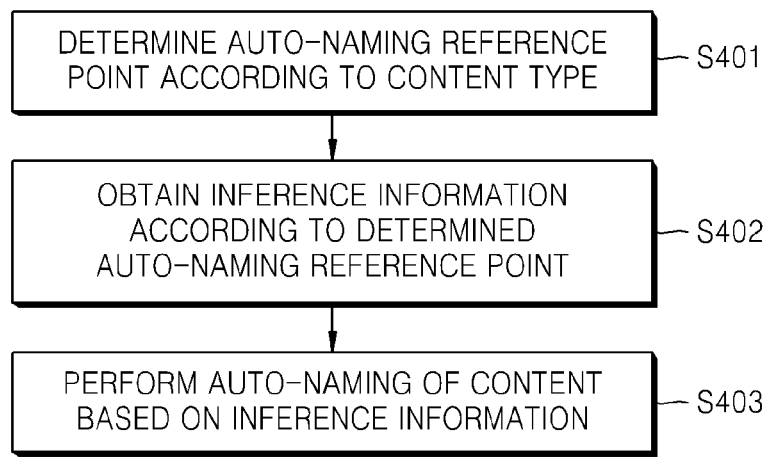
FIG. 4 is a flowchart illustrating a process of performing auto-naming in the method of FIG. 3.

FIG. 4 is a flowchart illustrating a process of performing auto-naming in the method of FIG. 3. Referring to FIG. 4, in step S401, the processor 110 determines an auto-naming reference point according to a content type. The auto-naming reference point corresponds to a parameter. If context-aware auto-naming is performed, the auto-naming reference point may refer to a context-aware model based on a parameter which may be determined according to a content type. Accordingly, the auto-naming reference point may vary according to a content type.

In step S402, the processor 110 obtains inference information according to the determined auto-naming reference point.

Figure 5:
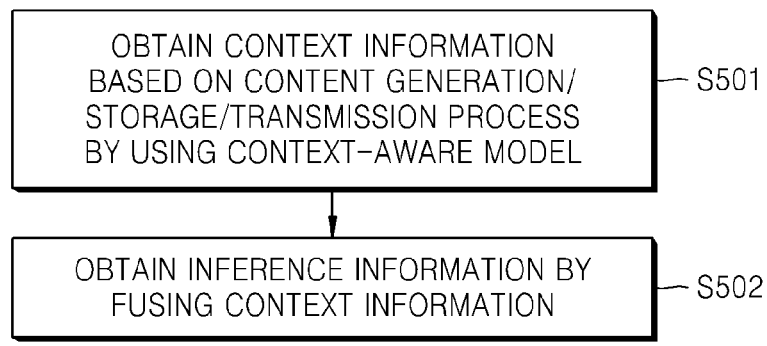
FIG. 5 is a flowchart illustrating a process of obtaining inference information according to a reference point determined in the process of FIG. 4.

FIG. 5 is a flowchart illustrating a process of obtaining inference information according to a reference point determined in the method of FIG. 3. FIG. 5 shows a case of using the context-aware model.

For example, when content is generated through the content generation process and the generated content is a photograph, the context-aware model is determined to detect a content generation time, a content generation position, and a subject included in the content. Once the context-aware model is determined, in step S501, the processor 110 obtains context information based on the determined context-aware model and the content generation process. The obtained context information includes content generation time information, content generation position information, and subject information about the subject included in the content. To this end, the processor 110 drives a corresponding application module among application modules stored in the storage unit 107, as described above with reference to FIG. 2. When the generated content is a Word electronic document, the obtained context information may include, but is not limited to, representative keyword information and producer information.

When detected time information is Mar. 19, 2012, detected position information is a latitude of 37.5° N and a longitude of 127.5° E, and detected subject information is a son, the processor 110 uses each item of information to produce context information which the user may intuitively recognize. In this case, the context information may also be referred to as content generation context information.

That is, when a database from which the context information may be obtained based on the detected information is stored in the storage unit 107, and when the detected time information stored in the database is defined such that a region where the apparatus 100 is used has four seasons and March is indicated by a natural language expression that corresponds to 'spring', the processor 110 obtains content generation context information of 'spring'. Also, when the detected position information stored in the database is defined such that a position corresponding to the latitude of 37.5° N and the longitude of 127.5° E is indicated by a natural language expression that corresponds to 'zoo which is located in Makgye-dong, Gwacheon-si', the processor 110 obtains content generation context information of 'zoo'. Also, when the detected subject information about the subject stored in the database is indicated by a natural language expression that corresponds to 'son', the processor 110 obtains content generation context information of 'son'. Step S501 in FIG. 5 may be performed in the content storage process or the content transmission process.

When the processor 110 obtains the content generation context information, that is, 'spring', 'zoo', and 'son', in step S502, the processor 110 fuses the obtained content generation context information to obtain a fused result and obtains inference information by using statistical inference. That is, the inference information obtained according to the fused result may become 'spring picnic, zoo, son'.

Once the inference information is obtained, in step S403 of FIG. 4, the processor 110 performs auto-naming of the content based on the inference information. The auto-naming may simply align the inference information or may rearrange the inference information according to grammar rules of a national language preset in the storage unit 107. For example, the auto-naming may be performed with a natural language expression of 'going on a spring picnic to the zoo with my son'.

When the auto-naming is completed, in step S303 of FIG. 3, the processor 110 displays the auto-naming result on the touch-screen 103.

Figure 6:
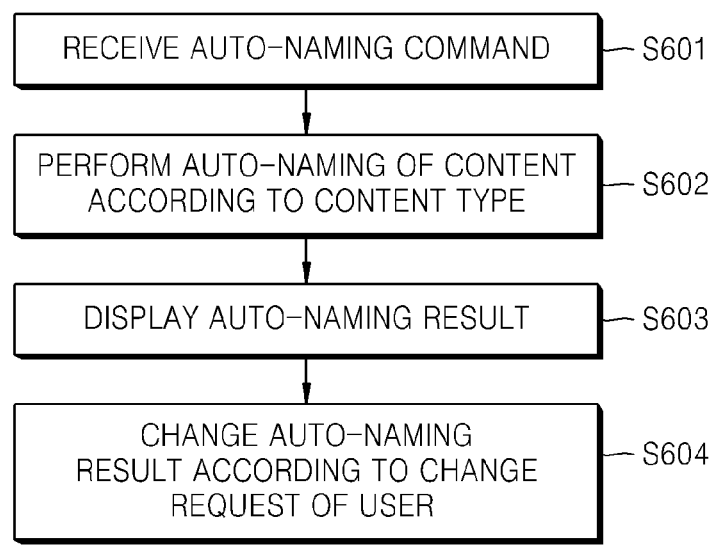
FIG. 6 is a flowchart illustrating a method of performing auto-naming of content according to another exemplary embodiment.

FIG. 6 is a flowchart illustrating a method of performing auto-naming of content according to another exemplary embodiment. FIG. 6 illustrates a case where a function of changing the auto-naming result is changed according to a user's change request for the auto-naming result displayed according to the method of FIG. 3. Steps S601 through S603 of FIG. 6 are substantially similar to steps S301 through S303 of FIG. 3, and thus an explanation thereof will not be given here.

When the auto-naming result is displayed on the touch-screen 103, and a user change request is received, in step S604, the processor 110 changes the auto-naming result displayed on the touch-screen 103. When the auto-naming result is changed by re-performing auto-naming, a condition for obtaining the context information and a condition for the obtaining inference information may be changed. For example, conditions about a search range and a search probability of the context information and the inference information may be changed.

Figure 7B:
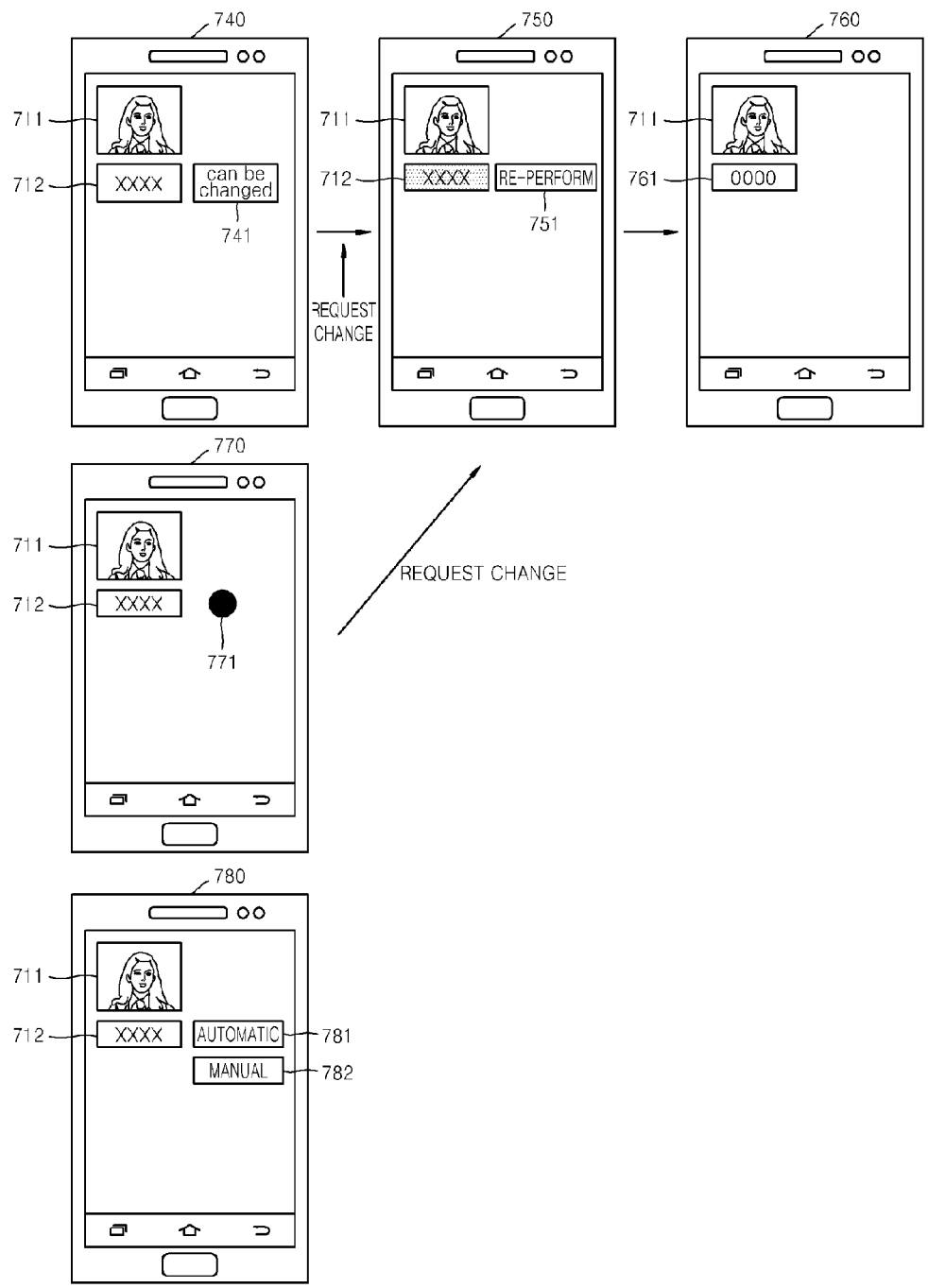

FIGS. 7A, 7B, and 8 are views illustrating cases where an auto-naming result displayed on the touch-screen 103 is changed according to exemplary embodiments.

FIG. 7A illustrates a case where the auto-naming result is changed due to information manually input by the user. That is, when an auto-naming result 712 of content 711 which is generated as shown in a screen image 710 is displayed on the touch-screen 103, and a change request for the auto-naming result is received, the processor 110 may change the screen image 710 into a screen image 720. Referring to the screen image 720, due to the change request, the auto-naming result 712 is changed to a state where the auto-naming result 712 may be changed by an input from a virtual keyboard 721, which is displayed on the touch-screen 103. When a desired name is input by the user by using the virtual keyboard 721, the auto-naming result 712 of the content 711 is changed into an auto-naming result 731 to be displayed in a screen image 730.

FIG. 7B illustrates a case where the user requests an automatic change or selectively request a manual change or an automatic change. That is, assuming that the content 711 and the auto-naming result 712 of the content 711 are displayed in a screen image 740 or a screen image 770, and an indicator 741 or 771 indicating that the auto-naming result 712 may be changed is displayed, when a change request based on the displayed indicator 741 or 771 is received, the processor 110 displays an image 751 indicating that auto-naming is re-performed as shown in a screen image 750, and displays an auto-naming result 761 of the re-performing of the auto-naming. The indicators 741 and 771 are not limited thereto and may be displayed in other forms. Also, guide information (not shown) about the image 751 displayed on the screen image 750 may be provided as other content or in other form.

Indicators 781 and 782 as shown in a screen image 780 displayed on the touch-screen 103 indicate that the user may select whether auto-naming is re-performed automatically as shown in the screen images 740 and 770 or manually by the user's input information as shown in a screen image 720 in FIG. 7A. Thus, the user may selectively change the auto-naming result in the screen image 780 automatically or manually.

FIG. 8 illustrates a case where auto-naming is performed on a plurality of contents. That is, when various types of contents are displayed as shown in a screen image 810 and an auto-naming command for contents included in a block 821 as shown in a screen image 820 is received, the processor 110 performs auto-naming of the contents by using different parameters according to various content types of the contents. Also, the auto-naming may be performed by using different context information according to, e.g., a content transmission context or a content storage context.

Auto-naming results according to the different types of contents may be displayed as shown in a screen image 830.

Figure 9:
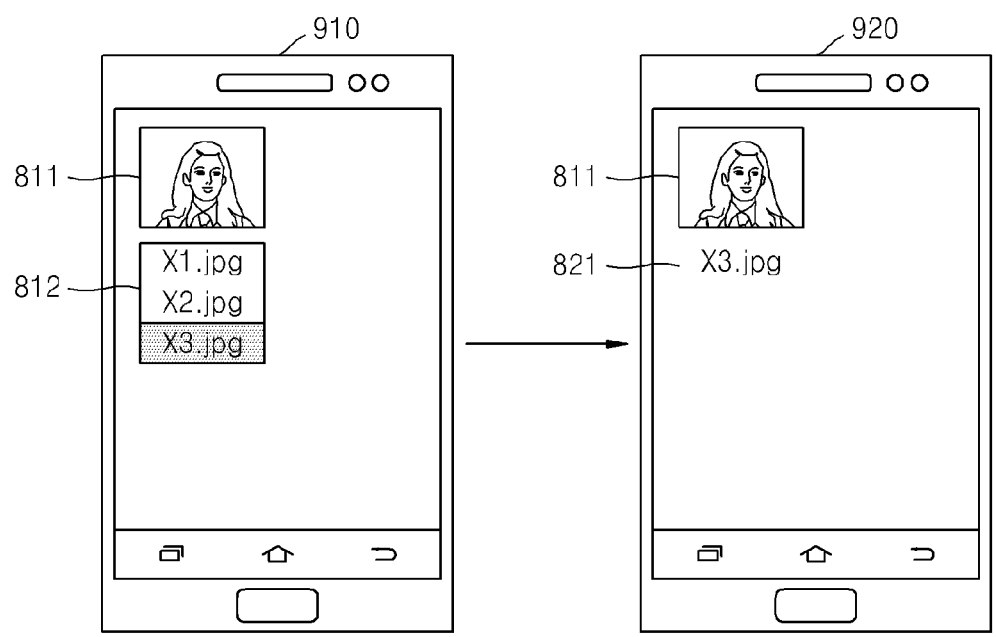
FIG. 9 is a view illustrating a case where a plurality of candidate names for an item of content are displayed and one of the plurality of candidate names is selected.

FIG. 9 is a view illustrating a case where a plurality of candidate names for one generated item of content according to an auto-naming process are displayed and one of the plurality of candidate names is selected. That is, a plurality of candidate names 812 for a generated content 811 according to the auto-naming process are displayed as shown in a screen image 910 and a name x3.jpg is selected from the candidate names 812. Accordingly, an auto-naming result of the generated content 811 may be displayed on the touch-screen 103 as shown in a screen image 920.

FIG. 10 is a flowchart illustrating an operation between the server 1000 and the apparatus 100 for performing auto-naming of content according to an exemplary embodiment. The server 1000 may correspond to the external device 120 of FIG. 1.

In step 1001, the apparatus 100 and the server 1000 are connected to each other. In step 1002, the apparatus 100 receives the auto-naming command. In step 1003, the apparatus 100 detects information about content on which auto-naming is to be performed and transmits the detected information, i.e., content information, to the server 1000. The content information transmitted to the server 1000 may include information indicating whether the auto-naming command is responsive to the content generation request, the content storage request, or the content transmission request, and information indicating a content type. Also, the content information transmitted to the server 1000 may include information about a user request and parameter information for performing auto-naming.

In step 1004, the server 1000 receives the content information. In step 1005, the server 1000 performs auto-naming of the content by using a parameter according to the content type and the received content information. The auto-naming of the content may be performed by using different parameters according to different content types, as described above. In step 1006, the server 1000 transmits the auto-naming result to the apparatus 100. In step 1007, the apparatus 100 displays the received auto-naming result on the touch-screen 103.

Figure 11:
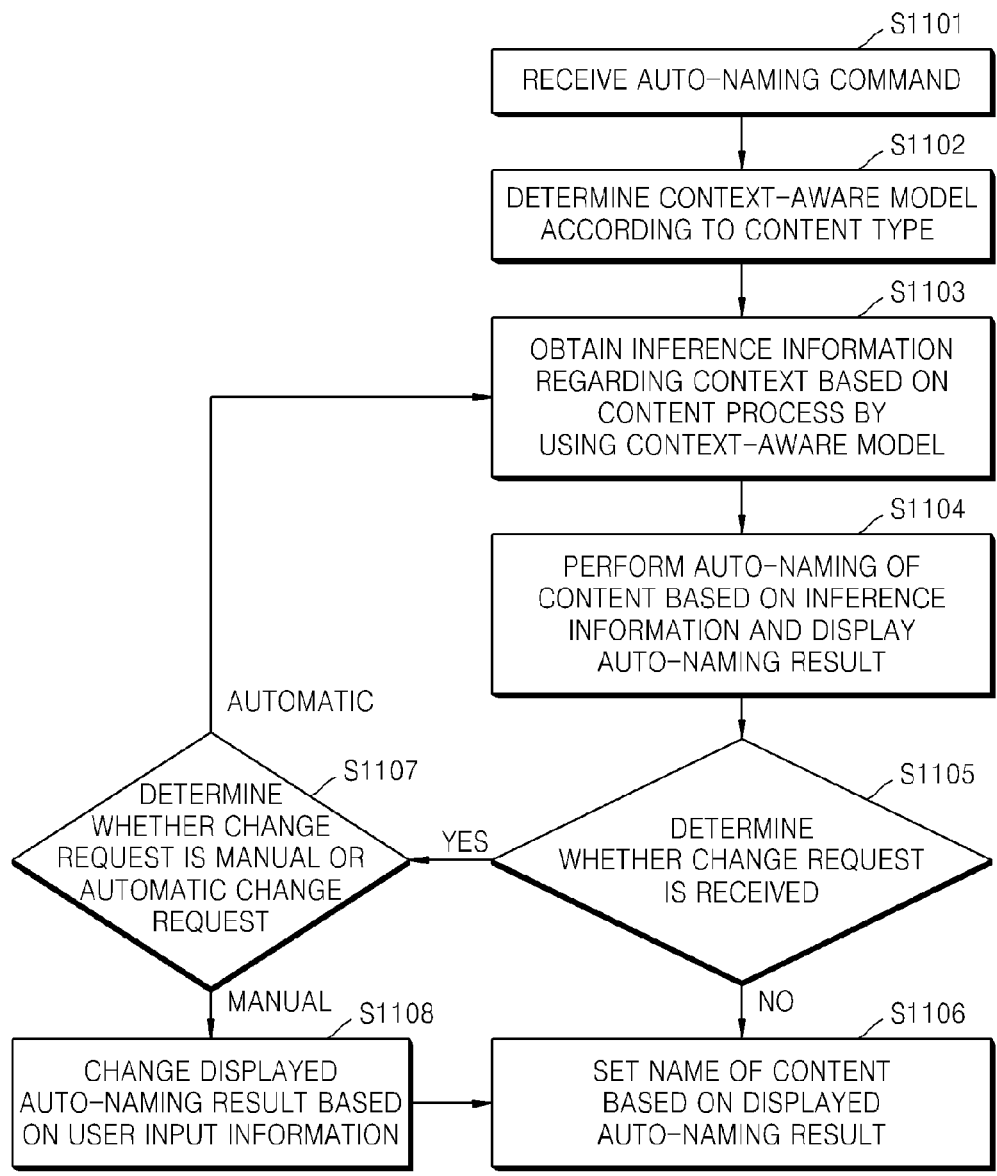
FIG. 11 is a flowchart illustrating a method of performing auto-naming of content according to still another exemplary embodiment.

FIG. 11 is a flowchart illustrating a method of performing auto-naming of content according to still another exemplary embodiment. FIG. 11 illustrates a process of changing auto-naming in the method of FIG. 6 in detail and illustrates a case where auto-naming is performed on content using the context-aware model.

That is, in step S1101, an auto-naming command for content is received. In step S1102, the processor 110 determines the context-aware model according to the content type. The context-aware model may be determined, for example, according to parameters according to the content type.

In step S1103, the processor 110 obtains inference information regarding the context based on a content process by using the context-aware model. Examples of the content process include the content generation process, the content storage process, and the content transmission process. Step S1103 may include obtaining inference information for performing auto-naming of the content by using different parameters according to different content types. In step S1104, the processor 110 performs auto-naming of the content based on the inference information and displays an auto-naming result on the touch-screen 103.

In step S115, it is determined whether a change request for the displayed auto-naming result is received. When it is determined in step S1105 that the change request for the displayed auto-naming result is not received, the method proceeds to step S1106. In step S1106, the processor 110 sets a name of the content based on the displayed auto-naming result.

However, when it is determined in step S1105 that the change request for the displayed auto-naming result is received, the method proceeds to step S1107. In step S1107, the processor 110 determines whether the change request is a manual change request or an automatic change request. Whether the change request is a manual change request or an automatic change request may be determined by using the user input information input as already described with reference to FIGS. 7A and 7B.

When it is determined in step S1107 that the change request is the automatic change request, the method proceeds to step S1103. In step S1103, the processor 110 re-performs a process of obtaining the inference information about the content by using the context-aware model. In this case, a condition for obtaining the inference information may be changed, as described above.

When it is determined in step S1107 that the change request is the manual change request, the method proceeds to step S1108. In step S1108, the processor 110 changes the displayed auto-naming result by using information input by using, for example, the virtual keyboard 721 as shown in FIG. 7A.

Figure 12:
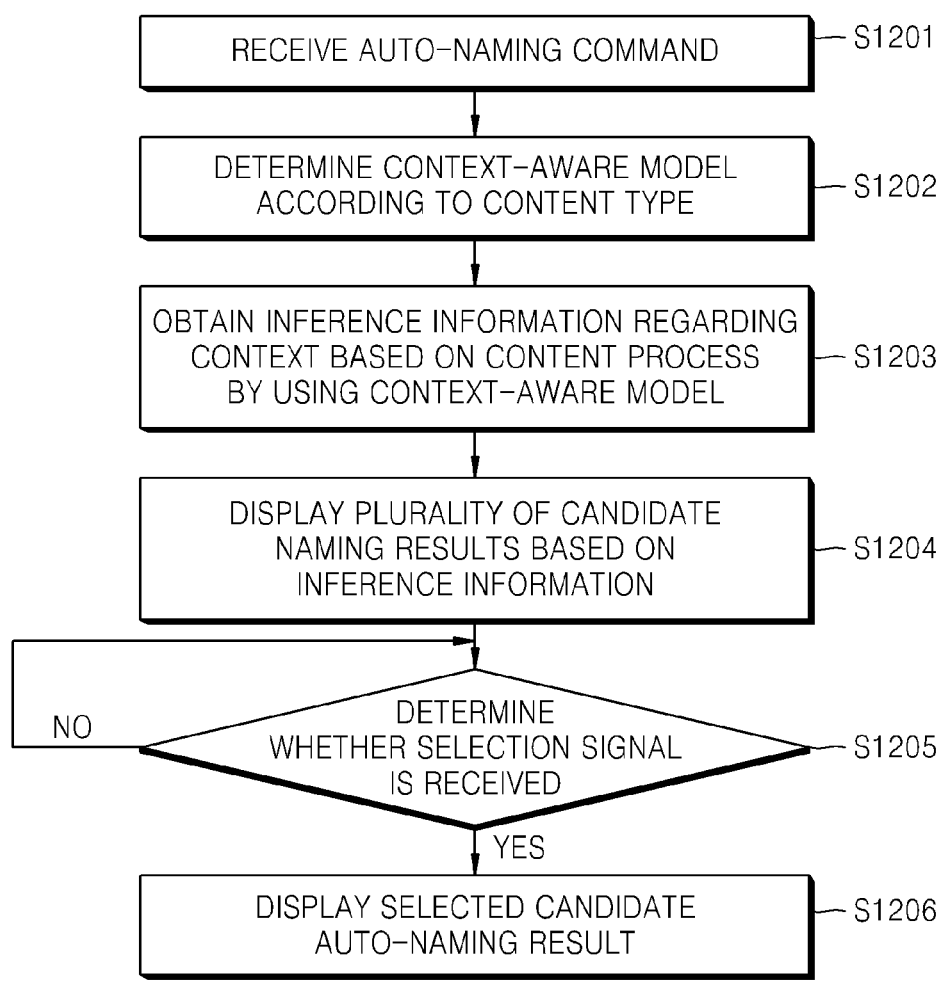
FIG. 12 is a flowchart illustrating a method of performing auto-naming of content according to another still exemplary embodiment.

FIG. 12 is a flowchart illustrating a method of performing auto-naming of content according to still another exemplary embodiment. FIG. 12 illustrates a case where a plurality of candidate naming results are displayed as shown in the screen image 910 of FIG. 9. Steps S1201 through S1203 of FIG. 12 are substantially similar to steps S1101 through S1103 of FIG. 11, and thus an explanation thereof will not be given here.

In step S1204, a plurality of candidate auto-naming results are displayed on the touch-screen 103 as shown in the screen image 910 of FIG. 9 based on the inference information. In step S1205, it is determined whether input information that selects one of the plurality of candidate auto-naming results displayed on the touch-screen 103 by, for example, a touch on the touch-screen 103 or through the user input unit 101 is received. When it is determined in step S1205 that the input information is received, the method proceeds to step S1206. In step S1206, a name of the content is displayed as shown in the screen image 920 of FIG. 9 based on the selected candidate auto-naming result.

Figure 13:
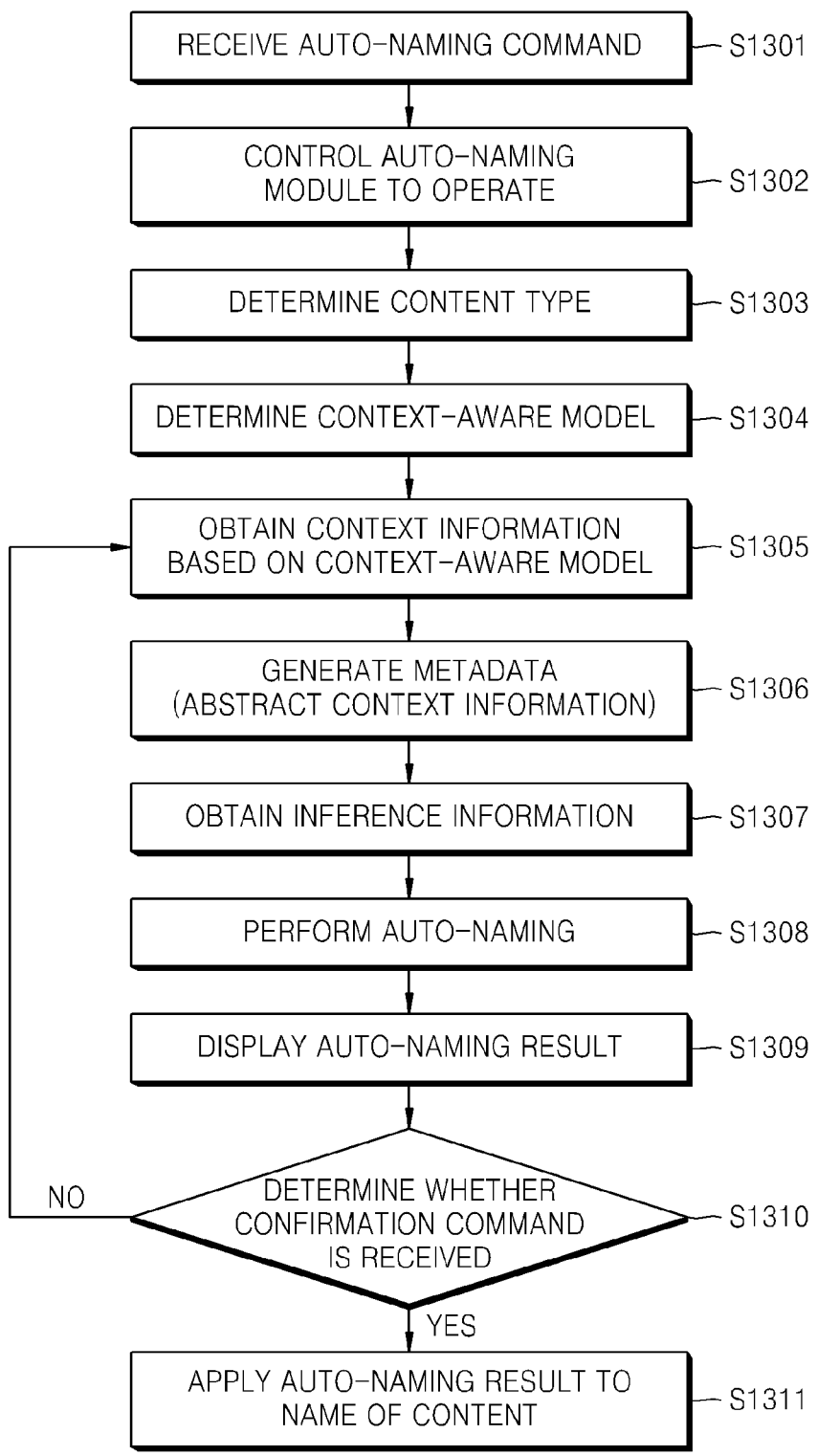
FIG. 13 is a flowchart illustrating a method of performing auto-naming of content according to another still exemplary embodiment.

FIG. 13 is a flowchart illustrating a method of performing auto-naming of content according to still another exemplary embodiment. Referring to FIG. 13, in step S1301, the auto-naming command is received. In step S1302, the processor 110 loads the auto-naming module 217 stored in the storage unit 107 and controls the auto-naming module 217 to begin to operate.

In step S1303, the processor 110 determines the content type of the content on which auto-naming is to be performed. In step S1304, the processor 110 determines the context-aware model in order to perform auto-naming by using a parameter according to the determined content type.

In step S1305, the processor 110 obtains the context information according to the content process based on the determined context-aware model. In this case, the obtained context information corresponds to raw data. Accordingly, in step S1306, the processor 110 generates metadata corresponding to the context information by abstracting the obtained context information.

In step S1307, the processor 110 obtains inference information by using the generated metadata. The inference information may be obtained using a statistical mechanism, and to this end, the processor 110 may store an inference database corresponding to the inference information in the storage unit 107.

Once the inference information is obtained, the method proceeds to step S1308. In step S1308, the processor 110 performs auto-naming of the content by using the inference information. In step S1309, the processor 110 displays the auto-naming result on the touch-screen 103.

In step S1310, it is determined whether a confirmation command of the user for the displayed auto-naming result is received. When it is determined in step S1310 that the confirmation command is received, the method proceeds to step S1311. In step S1311, the processor 110 applies the displayed auto-naming result to a name of the content. The confirmation command may also be referred to as an acknowledgement command or an OK command for the auto-naming result. However, when it is determined in step S1310 that the confirmation command is not received, the processor 110 may return to step S1306 and may re-perform an operation of obtaining the context information based on the context-aware model through an operation of determining whether the confirmation command of the user for the displayed auto-naming result is received. In this case, a driving reference point for driving the context-aware model may be changed or the determined context-aware model may be changed. The changing of the driving reference point may include changing a recognition rate of the face recognition module 212 from, for example, 90% to 80%. The changing of the determined context-aware module may include changing a context-aware model based on a time, a position, and a subject to a context-aware model based on a position and a subject. The changing of the driving reference point or the determined context-aware model may correspond to changing of a reference point for auto-naming.

Figure 14:
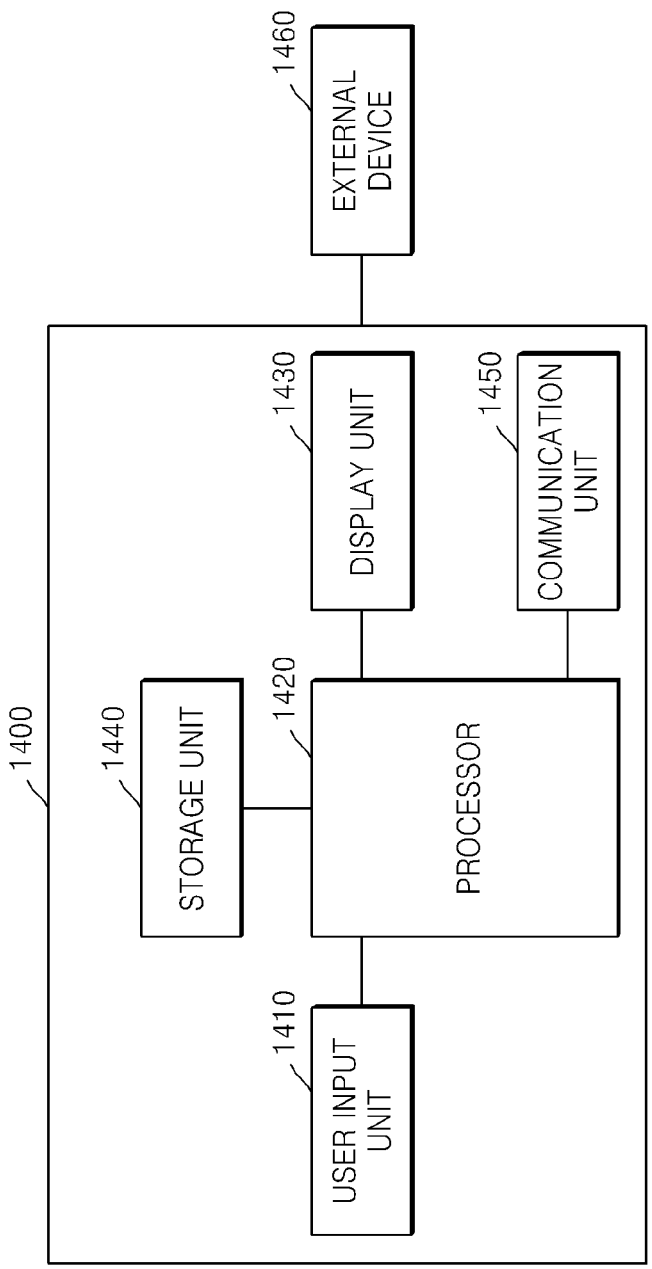
FIG. 14 is a block diagram illustrating an apparatus for performing auto-naming of content and an external device according to another exemplary embodiment.
Figure 15:
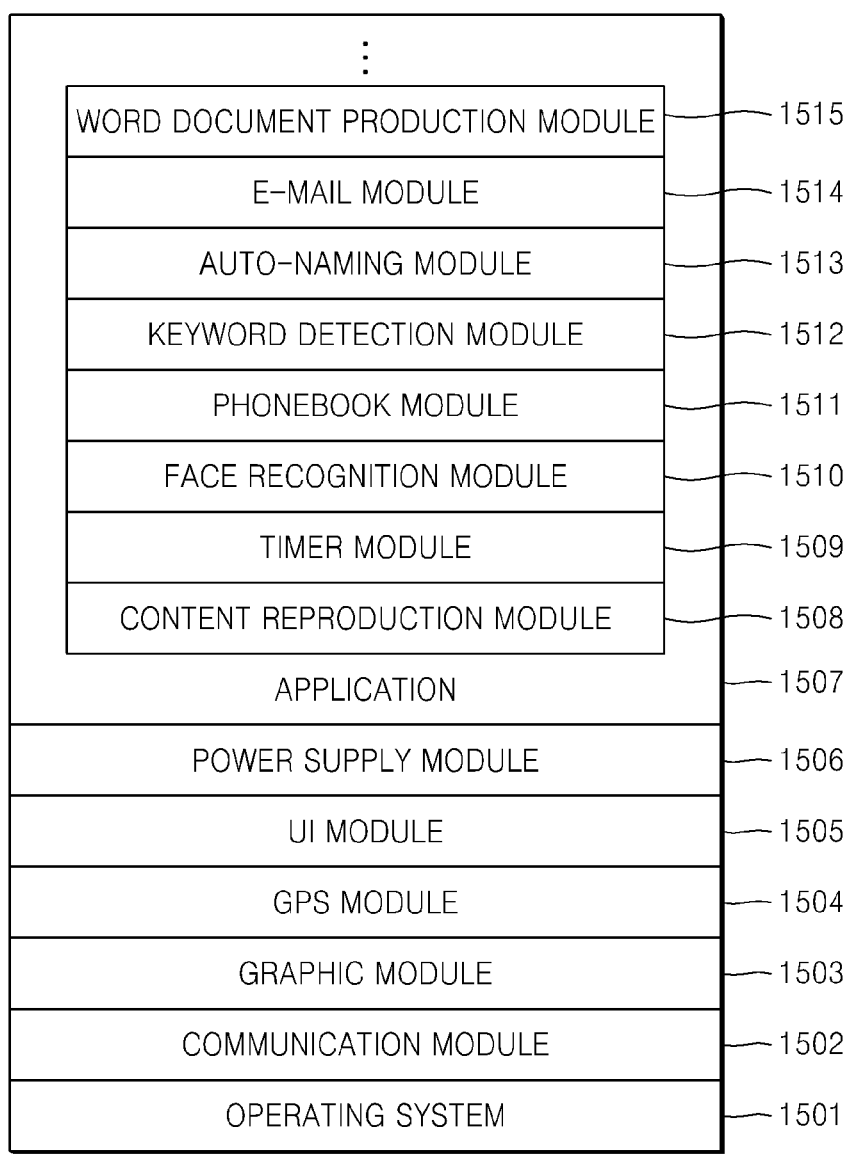
FIG. 15 is a table showing software and/or instruction sets stored in a storage unit of FIG. 14.

FIG. 14 is a block diagram illustrating an apparatus 1400 for performing auto-naming of content and an external device 1460 according to another exemplary embodiment and FIG. 15 is a table showing software and/or instruction sets stored in a storage unit of FIG. 14.

Referring to FIG. 14, the apparatus 1400 includes an electronic device that may generate, store, and transmit content. Examples of the electronic device may include the portable device, a smart phone, a smart TV, a PC, a desktop PC, a notebook, a smart board, a tablet PC, a mobile device, a hand-held device or a hand-held computer, a media player, a PDA, and a digital CE device. Examples of the digital CE device may include a DTV and an IPTV.

Referring to FIG. 14, the apparatus 1400 includes a user input unit 1410, a processor 1420, a display unit 1430, a storage unit 1440, and a communication unit 1450.

The user input unit 1410 generates input data (or control data) for controlling a function of the apparatus 1400 and user input information. Examples of the user input unit 101 may include physical buttons (or hardware buttons), a dial, a slider switch, a joystick, a click wheel, a keypad, a dome switch, a touchpad which may substitute for a mouse, a jog wheel, and a jog switch.

The processor 1420 determines the content type by using at least one program stored in the storage unit 1440 according to the auto-naming command and performs auto-naming according to the determined content type. The auto-naming may be performed as described with reference to FIG. 1.

When the auto-naming is performed based on the context-aware model, the processor 1420 determines the content type by using at least one program stored in the storage unit 1440 according to the auto-naming command for the content, and determines the context-aware model according to the determined content type.

To this end, software and/or instruction sets as shown in FIG. 15 may be stored in the storage unit 1440. The software and/or instruction sets shown in FIG. 15 are the same as those in FIG. 2 except for types of applications included in an application module 1507. Although functions of modules shown in FIGS. 1 and 15 may be similar, substantive functions in a practical application may vary according to reference point requirements set between the apparatus 100 of FIG. 1 and the apparatus 1400 of FIG. 14. For example, a function of an operation system 1501 may be different from that of the operating system 201.

Referring to FIG. 15, when the application module 1507 as shown in FIG. 15 is stored in the storage unit 1440, examples of content on which auto-naming is to be performed in the apparatus 1400 may include a Word document file produced by a Word document production module 1515, an e-mail file generated by an e-mail module 1514, and content received through the communication unit 1450.

The processor 1400 obtains the content generation context information by using at least one program stored in the storage unit 1440 based on the determined context-aware model. Once the content generation context information is obtained, the processor 14700 obtains the inference information by fusing the obtained content generation context information.

For example, when content is a video, parameters which may be detected from the content may include the content generation time, the content generation position, and the subject included in the content. Accordingly, the processor 1400 may obtain the context information by using a face recognition module 1510, a GPS module 1504, and a timer module 1509 based on the context-aware model and may obtain the inference information by using the obtained context information.

When the content is a file or a text, a parameter which may be detected from the content may include the content generation time, the content generation position, a keyword included in the content, and a content producer. Accordingly, the processor 1400 may obtain the context information by using the GPS module 1504, the timer module 1509, a producer detection module (not shown), and a keyword detection module 1512 based on the context-aware model and may obtain the inference information by using the obtained context information. The producer detection module may detect user information registered in log file information as producer information.

When the content is a sound sequence, parameters which may be detected from the content may include the content generation time, the content generation position, an artist, a genre, a title, and a content producer. Accordingly, the processor 1400 obtains the context information by using modules stored in the storage unit 1440 based on the context-aware model according to the parameters. When content is broadcast content, parameters which may be detected from the content may include a broadcast time, a number of broadcasts, a broadcast title, a cast, and a producer.

Inference information about a content generation context based on the context-aware model used herein refers to high-level context information which is derived from a statistical mechanism by fusing the context information detected from the content. For example, when the content is a photograph and the context information detected from the content is spring (generation time), a zoo (generation position), Hong Gildong (content producer), and a son of Hong Gildong (subject of the content), the context information corresponding to "Hong Gildong and his son, zoo, and spring picnic" may be obtained as the inference information by fusing the words 'spring', 'zoo', 'Hong Gildong', and 'son' and obtaining inference by using a statistical mechanism.

The processor 1420 performs auto-naming of the content based on the inference information. That is, when the inference information is obtained as described above, the processor 1420 may perform auto-naming of the content as 'going on a spring picnic to the zoo with my son'.

The display unit 1430 displays the auto-naming result of the content under the control of the processor 1420. The display unit 1430 may be configured, for example, as the touch-screen 103 of FIG. 1.

The communication unit 1450 may be configured as the communication unit 108 of FIG. 1 and may transmit/receive the content to/from the external device 1460. When the external device 1460 is a cloud server, the apparatus 1400 may request the auto-naming result of the content.

At least one program including command languages for performing auto-naming may be embodied as computer-readable codes on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

While the present disclosure has been particularly shown and described with reference to exemplary embodiments thereof by using specific terms, the embodiments and terms have merely been used to explain the present disclosure and should not be construed as limiting the scope of the present disclosure as defined by the claims. The exemplary embodiments should be considered in a descriptive sense only and not for purposes of limitation. Therefore, the scope of the inventive concept is defined not by the detailed description of exemplary embodiments but by the appended claims, and all differences within the scope will be construed as being included in the present disclosure.

What is claimed is:

1. A method of performing auto-naming of content, the method comprising:
   receiving, by a processor, an auto-naming command for the content;
   determining whether the auto-naming command is received by a content generation request, a content storage request, or a content transmission request;
   based on said determining, selecting different parameters to obtain at least one auto-naming result such that a first set of parameters from among the different parameters is selected in response to the auto-naming command being received with the content generation request, a second set of parameters from among the different parameters is selected in response to the auto-naming command being the content storage request, and a third set of parameters from among the different parameters is selected in response to the auto-naming command being received with the content transmission request;
   determining, by the processor, a parameter according to a type of the content;
   obtaining, by the processor, inference information regarding the content by using the parameter and the selected different parameters, which are attributes related to context of the content;
   performing, by the processor, the auto-naming of the content by using the inference information; and
   displaying, by a display, the at least one auto-naming result.

2. The method of claim 1, wherein the receiving the auto-naming command is performed in response to a content process request selected from among a plurality of content processes comprising a content generation process, a content transmission process, and a content storage process.

3. The method of claim 2, wherein the performing the auto-naming of the content comprises performing the auto-naming by using predetermined context information of the content corresponding to the requested content process and wherein the predetermined context information is different for different content processes from among the plurality of content processes.

4. The method of claim 1, further comprising automatically re-performing the auto-naming and displaying a new list with at least one different auto-naming result for the same content in response to an automatic change request of a user for the displayed auto-naming result.

5. The method of claim 1, further comprising:
   displaying an indicator in association with the displayed auto-naming result, wherein the indicator indicates an option to automatically change the displayed auto-naming result; and
   automatically re-performing the auto-naming of the content according to user input information input through the indicator.

6. The method of claim 5, wherein the automatically re-performing the auto-naming of the content comprises automatically re-performing the auto-naming with a changed condition for obtaining a parameter from the different parameters used to generate the auto-naming result and wherein the changed condition comprises decreasing required accuracy of the parameter and wherein a new list of new auto-naming results is displayed.

7. The method of claim 5, further comprising changing the displayed auto-naming result corresponding to the user input information in response to a manual change request of a user for the displayed auto-naming result.

8. The method of claim 1, further comprising changing the auto-naming result into the user input information in response to a manual change request of a user for the displayed auto-naming result.

9. The method of claim 1, wherein the obtaining the inference information comprises obtaining the inference information based on a communication with an external device.

10. The method of claim 1, wherein, when the auto-naming command for the content comprises auto-naming commands for a plurality of different types of content,
the performing the auto-naming of the content comprises respectively performing the auto-naming of the content by using a predetermined parameter according to a type of the content.

11. The method of claim 1, wherein the displayed auto-naming result comprises a plurality of candidate naming information,
wherein the method further comprises:
receiving a selection signal for selecting one of the plurality of candidate naming information; and
displaying the candidate auto-naming information selected according to the selection signal.

12. The method of claim 1, further comprising:
in response to determining that the auto-naming command is received with the content generation request, determining that the type of the content is an image being captured;
in response to the determining that the auto-naming command is received with the content storage request, determining that the type of the content is a video file; and
in response to the determining that the auto-naming command is received with the content transmission request, determining that the type of the content is an electronic document transmitted externally outside an apparatus comprising the display and the processor;
wherein the first parameter set comprises at least one of a location of the image being captured, an identification of an entity displayed in the image, and time information with respect to the captured image; and
wherein the third parameter set comprises at least one of an author that generated the electronic document and representative keywords that are found in the electronic document.

13. The method of claim 1, wherein the performing of the auto-naming comprises:
determining a type of the content;
further modifying a parameter set based on the determined type of the content, wherein the selected parameter set comprises a plurality of parameters, each of which describes an aspect of the context provided in the content;
obtaining data based on the content for each of the plurality of parameters in the selected parameter set;
generating a list of candidate names for the content by fusing the obtained data of different parameters based on a predetermined schema indicates various combinations of parameters selected from the plurality of parameters; and
displaying the list of candidate names for a file name of the content.

14. The method of claim 13, wherein the selected parameter set is specific to a user and comprises inference information about a relationship of the user to the content.

15. The method of claim 13, wherein the type of the content comprises social network service-based content type and an application specific content type and wherein different number of the parameters from a parameter set are fused to generate candidates of the list.

16. The method of claim 1, wherein the performing the auto-naming comprises performing the auto-naming of the content by using the same set of parameters in response to determining that content types are the same.

17. An apparatus for performing auto-naming of content, the apparatus comprising:
a memory configured to store at least one program and data for performing auto-naming of the content;
a touch-screen configured to receive user input information based on a touch and displays an auto-naming result of the content; and
a processor configured to, determine whether an auto-naming command is received during a content generation process, a content storage process, or a content transmission process, based on the determined process, select different parameters to obtain at least one auto-naming result, based on the auto-naming command, determine a parameter according to a type of the content, obtain inference information regarding the content by using the parameter and the selected different parameters, which are attributes related to context of the content, perform the auto-naming of the content by using the inference information, and display the auto-naming result on the touch-screen,
wherein a first set of parameters from among the different parameters is selected in response to the auto-naming command being received with a content generation request, a second set of parameters from among the different parameters is selected in response to the auto-naming command being a content storage request, and a third set of parameters from among the different parameters is selected in response to the auto-naming command being received with a content transmission request.

18. The apparatus of claim 17, wherein the auto-naming command is generated when the processor is requested to perform a content process selected from among a plurality of content processes comprising the content generation process, the content transmission process, and the content storage process, according to the user input information.

19. The apparatus of claim 18, wherein the processor is configured to perform the auto-naming of the content by using predetermined context information of the content according to the requested process and wherein the predetermined context information is different for different content processes from among the plurality of content processes.

20. The apparatus of claim 17, wherein the process is configured to automatically re-perform the auto-naming of the content in response to an automatic change request of a user for the displayed auto-naming result.

21. The apparatus of claim 20, wherein the processor is configured to change the displayed auto-naming result into the user input information in response to a manual change request of the user for the displayed auto-naming result.

22. The apparatus of claim 17, wherein the processor is configured to display on the touch-screen an indicator, which indicates an option to automatically change the displayed auto-naming result, in association with the displayed auto-naming result, and automatically re-perform the auto-naming of the content in response to the user input information input through the indicator.

23. The apparatus of claim 22, wherein the processor is configured to automatically re-perform the auto-naming with a changed condition for obtaining a parameter.

24. The apparatus of claim 17, wherein the processor is configured to change the displayed auto-naming result into the user input information in response to a manual change request of a user for the displayed auto-naming result.

25. The apparatus of claim 17, further comprising a communication unit configured to transmit or receive data to or from at least one external device,
 wherein the processor is configured to perform the auto-naming based on a communication with the at least one external device connected through the communication unit by using the at least one program.

26. The apparatus of claim 17, wherein, when the auto-naming command for the content comprises auto-naming commands for a plurality of different types of contents, the processor performs the auto-naming by using different parameters according to the plurality of different content types.

27. The apparatus of claim 17, wherein, when the displayed auto-naming result comprises a plurality of candidate naming information and a selection signal for selecting one of the plurality of candidate naming information through the touch-screen is received, the processor displays on the touch-screen candidate auto-naming information selected according to the selection signal.

28. An apparatus for performing auto-naming of content, the apparatus comprising:
 a touch-screen configured to receive user input information based on a touch and displays at least one auto-naming result of the content;
 at least one processor configured to provide a user interface by controlling the touch-screen to perform the auto-naming of the content; and
 a memory configured to store at least one program comprising a command configured to be executed by the processor,
 wherein the command is executed to:
  receive an auto-naming command for the content;
  determine whether the auto-naming command is received by a content generation request, a content storage request, or a content transmission request;
  select different parameters to obtain at least one auto-naming result based on the determined request such that a first set of parameters from among the different parameters is selected in response to the auto-naming command being received with the content generation request, a second set of parameters from among the different parameters is selected in response to the auto-naming command being the content storage request, and a third set of parameters from among the different parameters is selected in response to the auto-naming command being received with the content transmission request;
  determine a parameter according to a type of the content;
  obtain inference information regarding the content by using the parameter and the selected different parameters, which are attributes related to context of the content;
  perform the auto-naming of the content by using the inference information; and
  display the at least one auto-naming result,
 wherein the different content types are associated with the different parameters such that based on a first content type, a first set of parameters is selected and based on a second content type, a second set of parameters is selected, and
 wherein the first set of parameters comprise at least one different parameter from the second set of parameters.

29. A non-transitory computer-readable recording medium having embodied thereon at least one program comprising a command for performing a method of performing auto-naming of content,
 wherein the method comprises:
  receiving an auto-naming command for the content;
  determine whether the auto-naming command is received by a content generation request, a content storage request, or a content transmission request;
  select different parameters to obtain at least one auto-naming result based on the determined request such that a first set of parameters from among the different parameters is selected in response to the auto-naming command being received with the content generation request, a second set of parameters from among the different parameters is selected in response to the auto-naming command being the content storage request, and a third set of parameters from among the different parameters is selected in response to the auto-naming command being received with the content transmission request;
  determine a parameter according to a type of the content;
  obtain inference information regarding the content by using the parameter and the selected different parameters, which are attributes related to context of the content;
  performing the auto-naming of the content by using the inference information; and
  displaying the at least one auto-naming result.

* * * * *